US008789024B2

(12) United States Patent
Baron (10) Patent No.: US 8,789,024 B2
(45) Date of Patent: *Jul. 22, 2014

(54) INTEGRATION OF VISUALIZATION WITH SOURCE CODE IN THE ECLIPSE DEVELOPMENT ENVIRONMENT

(75) Inventor: Elliott Baron, Mississauga (CA)

(73) Assignee: Red Hat, Inc., Raleigh, NC (US)

( * ) Notice: Subject to any disclaimer, the term of this patent is extended or adjusted under 35 U.S.C. 154(b) by 863 days.

This patent is subject to a terminal disclaimer.

(21) Appl. No.: 12/612,545

(22) Filed: Nov. 4, 2009

(65) Prior Publication Data

US 2011/0107313 A1    May 5, 2011

(51) Int. Cl.
*G06F 9/30* (2006.01)
*G06T 11/20* (2006.01)

(52) U.S. Cl.
USPC .......................................... 717/130; 345/440

(58) Field of Classification Search
None
See application file for complete search history.

(56) References Cited

U.S. PATENT DOCUMENTS

| 6,972,761 | B1 * | 12/2005 | Cox et al. ...................... 345/440 |
| 7,539,604 | B1 * | 5/2009 | Stothert et al. .................... 703/6 |
| 7,714,864 | B2 * | 5/2010 | Cahill et al. ................... 345/440 |
| 2002/0116702 | A1 | 8/2002 | Aptus et al. |
| 2002/0170048 | A1 | 11/2002 | Zgarba et al. |
| 2003/0038831 | A1 | 2/2003 | Engelfriet |
| 2003/0188187 | A1 | 10/2003 | Uchida |
| 2004/0003119 | A1 * | 1/2004 | Munir et al. ................... 709/246 |
| 2005/0034106 | A1 | 2/2005 | Kornerup et al. |
| 2006/0106889 | A1 * | 5/2006 | Mannby ........................ 707/203 |
| 2006/0200799 | A1 * | 9/2006 | Wills et al. .................... 717/109 |
| 2010/0017788 | A1 * | 1/2010 | Bronkhorst et al. ........... 717/125 |
| 2010/0138811 | A1 | 6/2010 | Jayaraman et al. |
| 2010/0306736 | A1 | 12/2010 | Bordelon et al. |
| 2010/0313188 | A1 | 12/2010 | Asipov et al. |
| 2011/0107298 | A1 * | 5/2011 | Sebastian ...................... 717/113 |
| 2011/0107305 | A1 | 5/2011 | Baron |
| 2012/0036370 | A1 * | 2/2012 | Lim et al. ...................... 713/189 |

OTHER PUBLICATIONS

Kapa C++, Feb. 2007, http://kapo-cpp.blogspot.com.*
Catching memory leaks with valgrind's massif, May 2008, http://wingolog.org.*
J. des Rivieres et al., Eclipse: A platform for integrating development tools, IBM.*
J. des Rivieres et al., Eclipse; A platform for integrating development tools, 2004, IBM.*
Non-Final Office Action mailed Aug. 7, 2012 for U.S. Appl. No. 12/608,937.
Non-Final Office Action mailed Oct. 12, 2012 for U.S. Appl. No. 12/612,560.
Wingolog, Catching Memory Leaks with Valgrind's Massif, http://Winoglog.org/archives/2008/05/05/catching-memory-leaks-with-valgrinds-massif, May 5, 2008, 5 pages.
Kapo C++: Detecting Memory Leak, http://kapo-cpp.blogsport.com/2007/02/detecting-memory-leak.html, Feb. 25, 2007, 9 pages.

(Continued)

*Primary Examiner* — Hyun Nam
(74) *Attorney, Agent, or Firm* — Lowenstein Sandler LLP (57) ABSTRACT

A computer implemented method involving receiving by an integrated development environment an output file from a profiling utility to generate a line chart of data from the output file. The method to visualize profiling data for a binary file automatically and to displaying corresponding source code in response to a user selection of a data point in the line chart.

20 Claims, 6 Drawing Sheets

(56) References Cited

OTHER PUBLICATIONS

USPTO, Final Office Action for U.S. Appl. No. 12/608,937 mailed Mar. 14, 2013.

USPTO, Advisory Action for U.S. Appl. No. 12/608,937 mailed May 21, 2013.

USPTO, Advisory Action for U.S. Appl. No. 12/612,560 mailed Apr. 11, 2013.

\* cited by examiner

INTEGRATION OF VISUALIZATION WITH SOURCE CODE IN THE ECLIPSE DEVELOPMENT ENVIRONMENT

TECHNICAL FIELD

The embodiments of the invention relate to a integrated development environment. Specifically, the embodiments of the invention relate to an integrated development environment with an integrated source code and profiling data visualization interface.

BACKGROUND

Integrated development environments (IDE) provide a set of tools such as editing and debugging software for programmers. These tools are utilized to create and to debug new software programs. The IDE support software development by providing a windowed system for source file editing, project management, file interdependency management and debugging. ECLIPSE®, the Eclipse Foundation, is an IDE for C and C++ development on the LINUX® platform. ECLIPSE uses a plug-in based software model where all the components of the IDE are structured as plug-ins for the IDE.

There are many other types of programming tools that are not part of an IDE and are used on a stand-alone basis. One example of a stand alone tool is Valgrind. Valgrind is profiling utility that provides a suite of tools including a memcheck tool, an address check tool, a heap profiler tool and a cache profiler tool. Another example of a stand-alone programming tool is Oprofile. Oprofile is a profiling utility for the LINUX® platform that provides another suite of tools. The tools include a cache miss counter, a cache stall counter, a memory fetch counter and an additional set of profilers that can profile interrupt handlers and kernels. The tools of Valgrind and Oprofile are typically command line tools that generate simple flat output files.

BRIEF DESCRIPTION OF THE DRAWINGS

Embodiments of the invention are illustrated by way of example and not by way of limitation and the figures of the accompanying drawings in which like references indicate similar elements. It should be noted that different references to "an" or "one" embodiment in this disclosure are not necessarily to the same embodiment, and such references mean at least "one."

DETAILED DESCRIPTION

Figure 1:
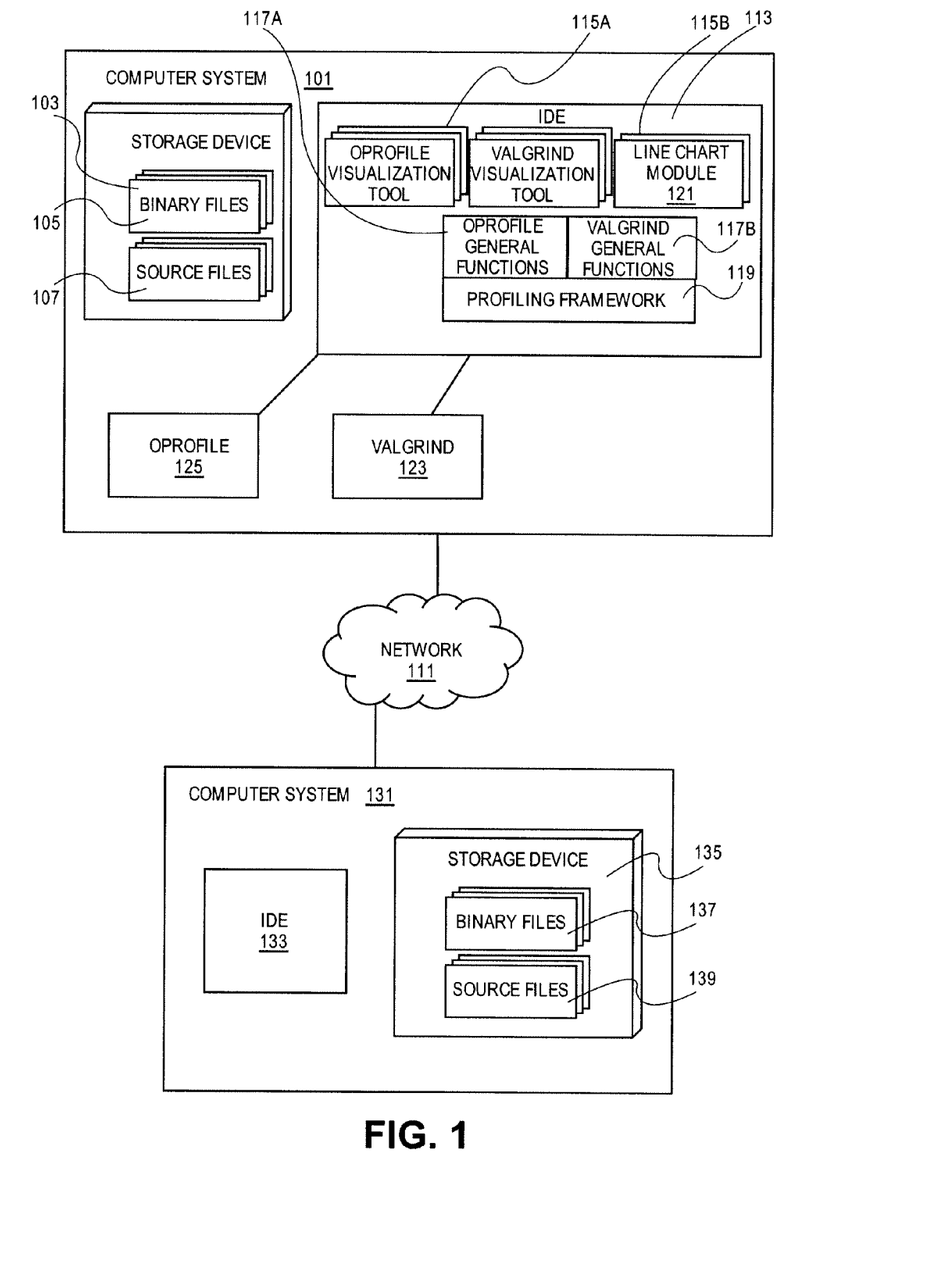
FIG. 1 is a diagram of one embodiment of an integrated development environment with an integrated source code and profiling data visualization tool.

FIG. 1 is a diagram of one embodiment of an integrated development environment with an integrated source code and profiling data visualization tool. In one embodiment, a computer system 101 implements the visualization tool and includes a storage device 103, an integrated development environment (IDE) 113 and a set of stand-alone tools 123, 125. In another embodiment, the IDE and the integrated source code and profiling data visualization tool are a part of a distributed system. In the distributed system embodiment, the computer system 101 communicates over a network 111 with a remote computer system 131. The distributed system can include any number of additional computer systems 131. For sake of clarity, a distributed embodiment with the single additional computer system 131 is described. One skilled in the art would understand that any number of additional computer systems could be included in a distributed system that incorporate similar features, functions and structures.

The computer system 101 can be any type of computing device including a desktop computer, a workstation, a dedicated server, a handheld device or a similar computing device. The network 111 can be a local area network (LAN), a wide are network (WAN), such as the Internet, or a similar communication system. The network 111 can include any number of intermediate computing devices and network elements between the communicating computer systems 101, 131. The network 111 can include any number or combination of wired and wireless communication mediums between the nodes in the network. Other computer systems 131 can also be any type of computing device including a desktop computer, a workstation, a dedicated server, a handheld computer system or similar computing device.

The computer system 101 can include any type and number of storage devices 103. The storage devices 103 can be fixed disk drives, removeable storage medium drives that are external or internal drives, random access memory (RAM), static memory or similar storage devices. The storage devices 103 can be used to store a set of binary files 105 and source files 107, as well as, installed programs and tools including the IDE 113 and stand alone tools 123, 125. The binary files 105 and source files 107 are data files that are part of a programming project managed by the IDE 113. The binary files 105 are compiled code generated from the source files 107. The source files 107 are sets of program instructions in a high level computer language like C or C++. A 'set,' as used herein refers to any positive whole number of items including one item.

The IDE 113 is an application for assisting a user in managing a software programming project. The IDE 113 assists in the management of source files 107 and binary files 105, program compiling, source file editing and similar tasks associated with software development. In one embodiment, the IDE 113 is the ECLIPSE® IDE. The IDE 113 can have a set of integrated tools or plug-ins 115A, 115B. These tools 115A, 115B assist the user in debugging, editing, compiling or similarly managing the project. In one example embodiment, the tools 115A, 115B are plug-ins that operate in conjunction with a set of utility specific general purpose or intermediate plug-ins or functions 117A or 11713 and a general purpose framework plug-in or component 119.

For example, the framework plug-in or component 119 can be a profiling framework for providing a set of functions relating to program execution profiling. The profiling framework can support interfacing with external utilities such as an Oprofile utility 125, a Valgrind utility 123 or similar programs. The framework plug-in or component 119 defines a set of functions that provide access to data structures and resources of the IDE to plug-ins of the IDE. A set of utility specific general purpose functions 117A, 117B for interfacing with each external program can also be defined. For example, an Oprofile specific set of functions can be provided through a plug-in 117A and a Valgrind specific set of functions can be provided through a plug-in 117B. Sets of tools 115A, 115B can then be provided that are specific to each of the external utilities and allow the user to interface with the functionality of those external utilities within the integrated development environment. This set of utility specific general purpose functions 117A, 117B define functions for calling the corresponding external utilities and passing parameters such as a selected binary to the external utility. The functions return the output of the external utility to be further processed by the tools 115A, 115B. These calling functions utilize the command line interfaces of the external utility and make them accessible to the tools 115A,115B.

These tools 115A, 115B can include an integrated source code and profiling data visualization tool that provides a graphical representation of the output of these external utilities. The tools 115A, 115B receive a selection of a binary that a user wants to process and utilize the profiling framework 119 component and specific general purpose functions 117A, 117B to call an external utility. The profiling framework 119 and specific general purpose functions 117A, 117B return the output of the external utility. The tools 115A,115B can then process this output data to generate the visualization. The specific examples of the Oprofile 125 and Valgrind 123 external utilities, the profiling framework 119, the Oprofile general functions 117A, the Valgrind general functions 117B and the Oprofile and Valgrind specific visualization tools 115A and 115B are provided by way of example. One skilled in the art would understand that the structures, functions, and principles described in regard to these specific examples are applicable to any external tool that can be integrated and provided through a visual interface within the IDE 113 through a similar software structure, set of general function and tools. In further embodiments, the framework 119, general functions 117A, 117B and tools 115A, 115B can be integrated into a monolithic plug-in or directly integrated into the IDE. Other permutations of these configurations are also within the scope of the invention.

The external tools 123, 125 are stand alone utilities. These external utilities 123, 125 are command line programs for use on the LINUX® platform. The plug-ins of the IDE 113 enable the interfacing of the IDE 113 with these external utilities 123, 125 and the utilization of the output of these utilities within the IDE 113 environment. The profile framework 119 in combination with the general functions 117A, 117B, and tools 115A, 115B enable interfacing with the functionality of these external utilities in the IDE 113 environment as an integrated visual experience. Further, the tools 115A, 115B enable a visual integration with the source code 107 and the output of the external utilities. For example, the output of the utilities can be visually displayed as chart such as a line chart using a line chart module 121. The line chart module 121 can be a plug-in or similar component similar to the tools 115A, 115B. Its functionality can be accessed by function calls or similar operations within the IDE environment. The tools 115A, 115B further provide the functionality that a chart can be interactive such that a data point in the chart can be correlated with a line or set of lines in the source code 107, which then can be displayed to a user upon selection of the data point in the displayed chart. The functionality of the tools 115A, 115 can be specific to the corresponding external utility.

In a distributed computing environment, a remote computer system 131 can be used to provide access to additional binary files 137 or source files 139 on the storage device 135 within the computer system 131. One of ordinary skill in the art would understand that any combination of resources can be provided over a network 111 by a computer system 131 to a user of an IDE 113 on the computer system 101. Similarly, the user of a computer system 131 and IDE 133 on that computer system 131 can interact with and utilize resources from the computer system 101 over the network 111. In this manner, the distributed computing environment enables the use of resources across the network 111 that allow a user of an IDE 113, 133 to access a larger range of resources that are present on each of the distributed computer systems 101, 131.

Figure 2:
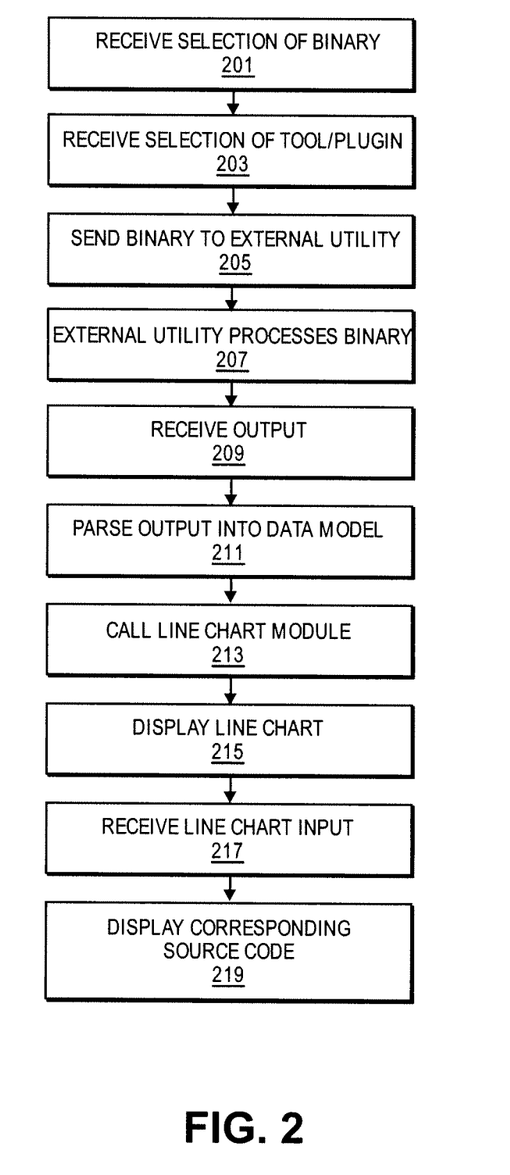
FIG. 2 is a flowchart for one embodiment for a process for generating an integrated source code and profiling data visualization interface.

FIG. 2 is a flowchart for one embodiment for a process for generating an integrated source code and profiling data visualization interface. In one embodiment, the process may be initiated by a user selecting a binary within the menu system of the integrated development environment (Block 201). The binary is selected by the user for execution, debugging, profiling or similar analysis. The user selects the specific tool or plug-in or set of tools or plug-ins to apply to the selected binary (Block 203). The selected tools are then provided with the binary file by the IDE for processing. The tools or plug-ins process the binary using both their own functionality and the functionality of other plug-ins such as general purpose tool or plug-ins or plug-in frameworks. The binary is sent to the external utility associated with the selected tool for processing (Block 205). In one embodiment, the tool calls a function of the set of specific general purpose functions corresponding to external utility to be applied. A parameter of the function is the selected binary. The function initiates the external utility through its command line interface and provides the binary as a command line parameter. The external utility operates as a backend to the IDE system and the IDE tool as it is a separate component that interfaces with the IDE through the integrated source code and profiling data visualization tool. The examples of the backend utilities can include Valgrind and Oprofile. These backend utilities process the binaries as though they were operating in a stand-alone environment and generate their standard output, which is returned to the requesting plug-in tool of the IDE (Block 209). The calling functions that initiated the external utility receives the output of the external utility or retrieves it from a known location and provides the data or an address of the data to the requesting plug-in tool.

The plug-in tool then parses the received output from the external utility (Block 211). The plug-in tool is familiar with the format of the external utility and converts it to an intermediate format or a local format to facilitate the use of the output data. In one embodiment, the output is parsed into a data model specific to the tool or that is compatible with other tools or plug-ins of the integrated development environment. The tool then passes the data model to the line chart module or similar module through a function call or similar operation to process the output data received from the external utility to a visual representation (Block 213).

The line chart module is another IDE plug-in tool such as Birt, which is a line charting program. The line chart module can be a plug-in tool similar to the visualization tool and accessible through direct function calls to the plug-in. The visualization tool can reformat the data to a format acceptable to the line chart module. The line chart module processes the data received as a parameter or similarly received and returns a line chart based on the provided data. This line chart can then be displayed through the integrated development environment by the visualization tool (Block 215). The visualization tool also tracks user interaction with the displayed line chart. If user input is received by the visualization tool in relation to the line chart (Block 217), then a corresponding line of code from source code can be correlated. The visualization tool can rely on data model generated from the external utility output. The data model allows the visualization tool to correlate the data points and line chart with the source code lines in the source files. The visualization tool then may display the corresponding source code through a source code editor of the IDE or similar user interface mechanism (Block 219).

Figure 3A:
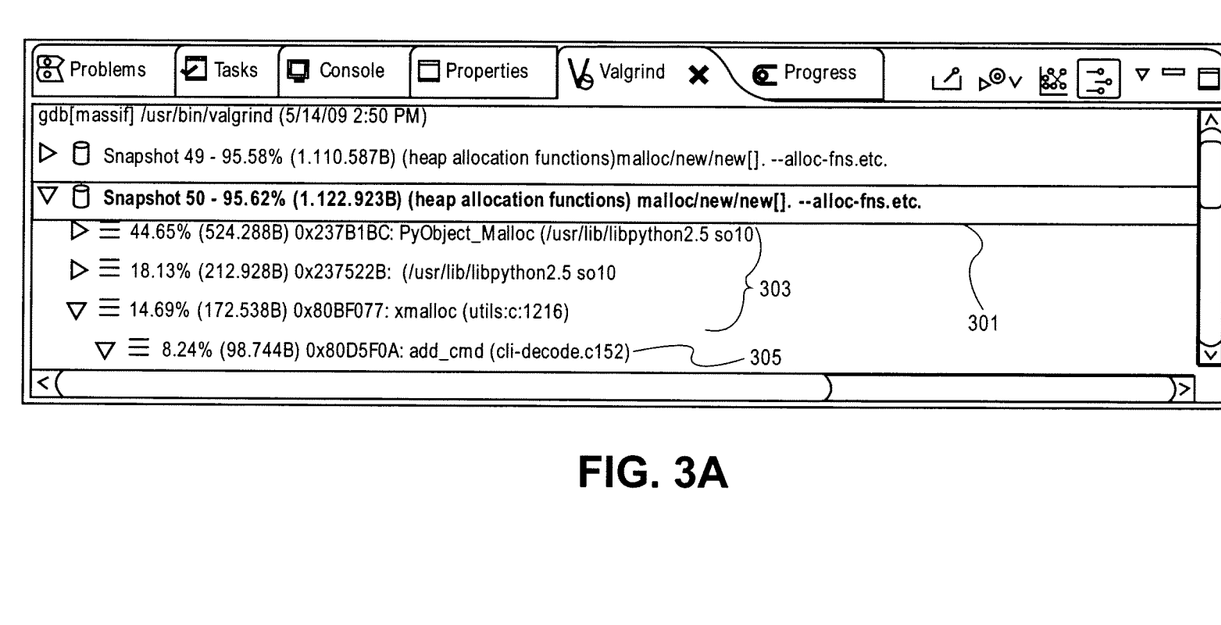
FIG. 3A is a diagram of one embodiment of a user interface for reviewing output of a profiling tool.

FIG. 3A is a diagram of one embodiment of a user interface for reviewing output of a profiling tool. In this example, the embodiment the external utility being visualized is Valgrind and more specifically the function Massif. Massif is a heap allocation tracking function. Massif generates snapshots of a program being analyzed. The integrated source code and profiling data visualization tool, provides a list of snapshots 301 to be provided in a tree structure or similar hierarchical structure. The tree structure allows the snapshots 301 to be drilled down to see the heap allocation percentages by each component 303 of an analyzed program. A further drill down enables a specific command or lines of code 305 to be identified for their heap allocation percentage. One skilled in the art would understand that other types of profiling data with other types of data structures can also be handled by the visualization tool. The data can be time sequenced and/or hierarchical. The tree view or similar view can also be omitted.

Figure 3B:
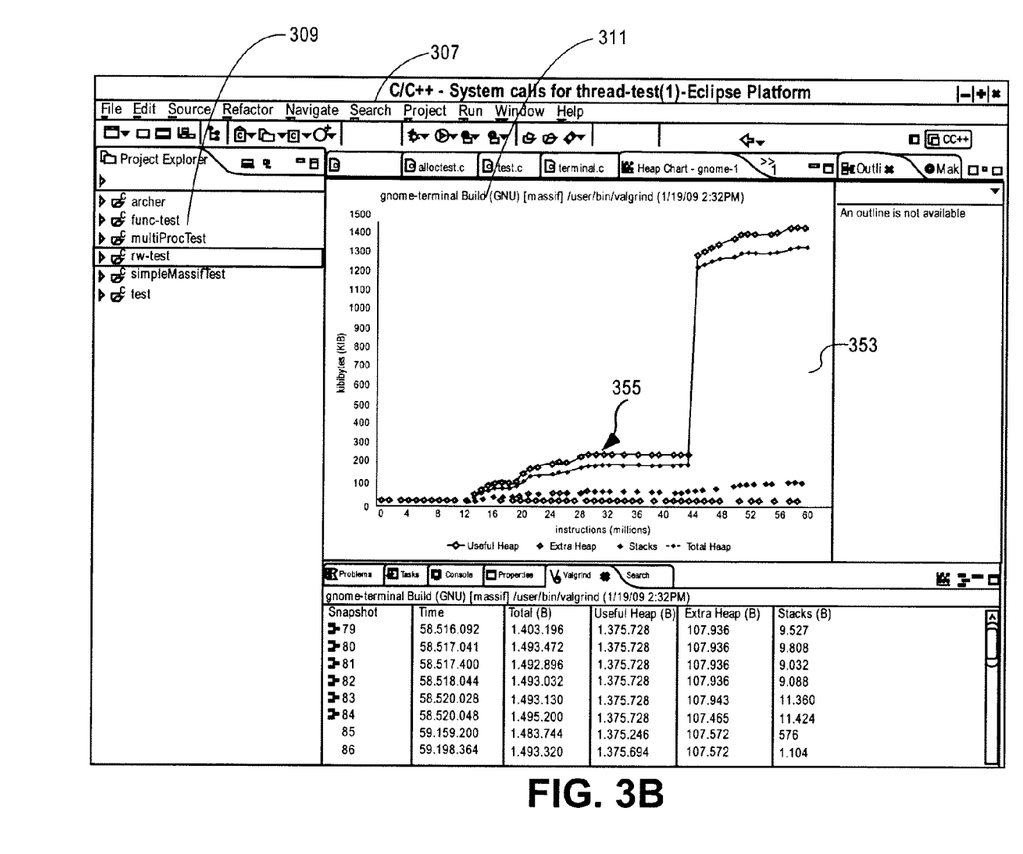
FIG. 3B is a diagram of one embodiment of the integrated profiling data and source code visualization interface.

FIG. 3B is a diagram of one embodiment of the integrated profiling data and source code visualization interface. In the example embodiment, the Massif snapshot data shown in FIG. 3A is charted using a charting module such as Birt. The line chart depicts each of the snapshots taken over time or a period of execution. The line chart 353 shows the number of executed instructions in millions when running the selected binary with the Massif tool for the useful heap, extra heap, stacks and total heap along the X-axis. The Y-axis shows the number of kibibytes allocated at each point in the execution for the useful heap, extra heap, stacks and total heap. The user can select any data point 355 in the line chart 353 to obtain the associated snap shot information or source code. The source code will be opened in a source code viewer or editor. In one embodiment, selection of a data point in the chart opens a listing of associated source code locations, which can then be selected by the user to be displayed in a source code viewer or editor. One skilled in the art would understand that if a list or snapshot is displayed, the list or snapshot can display the hierarchical structure and can then further be drilled down from this display. This source code and profiling data relation visualization is provided by the visualization tool through a windowing system of the integrated development environment. The visualization tool maintains the hierarchical data structure to store all of the 'snapshots' generated by an external utility such as Valgrind and organizes the data based on the function, time and similar data characteristics.

Figure 3C:
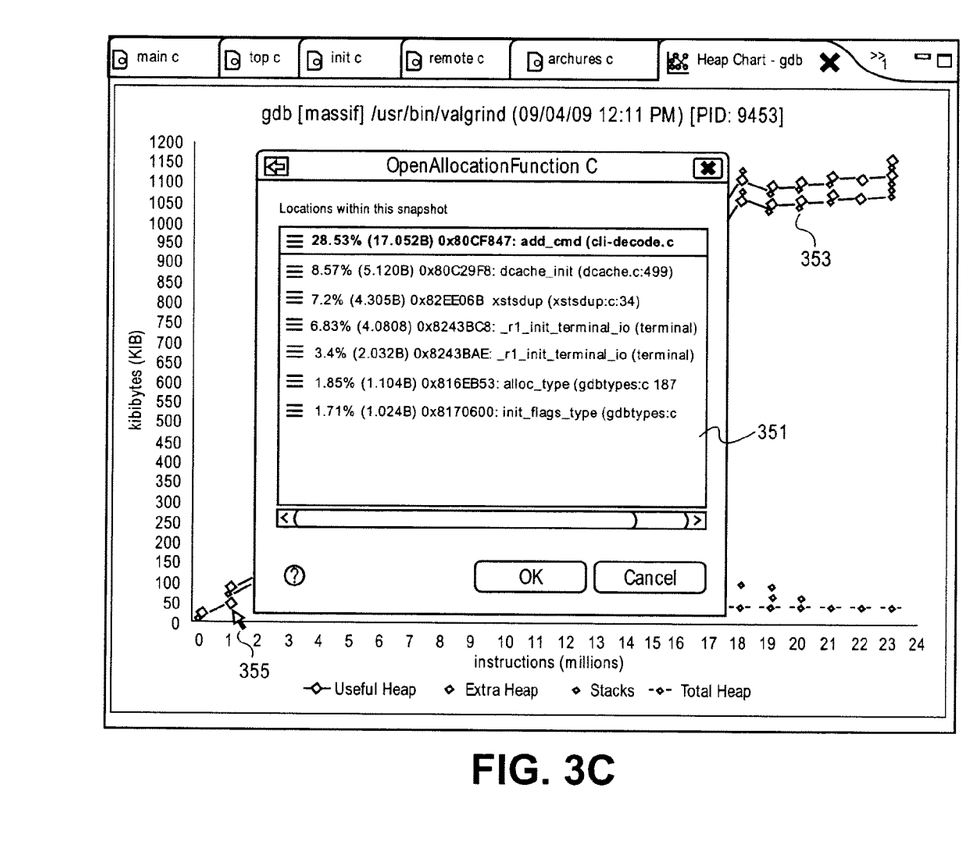
FIG. 3C is a diagram of one embodiment of the integrated profiling data and source code visualization interface.

FIG. 3C is a diagram of one embodiment of the integrated profiling data and source code visualization interface. In the example embodiment, a data point has been selected by a user to be displayed. A separate window, menu or pop-up 351 is displayed in response to selection of a data point 355 from the chart 353. The window 351 can provide additional details of the selected data point including further break downs of the data associated with the data point in the chart. For example, a percentage of the heap associated with a set of functions represented by the data point can be displayed. Each function could then be selected from the window to initiated the display of the associated source code. One skilled in the art would understand that the data presented in a window or similar presentation would be correlated to the type of profiling tool that is generating the underlying data and that any organization, breakdown or listing of the sub-components of the data or associated source code can be presented.

Figure 4:
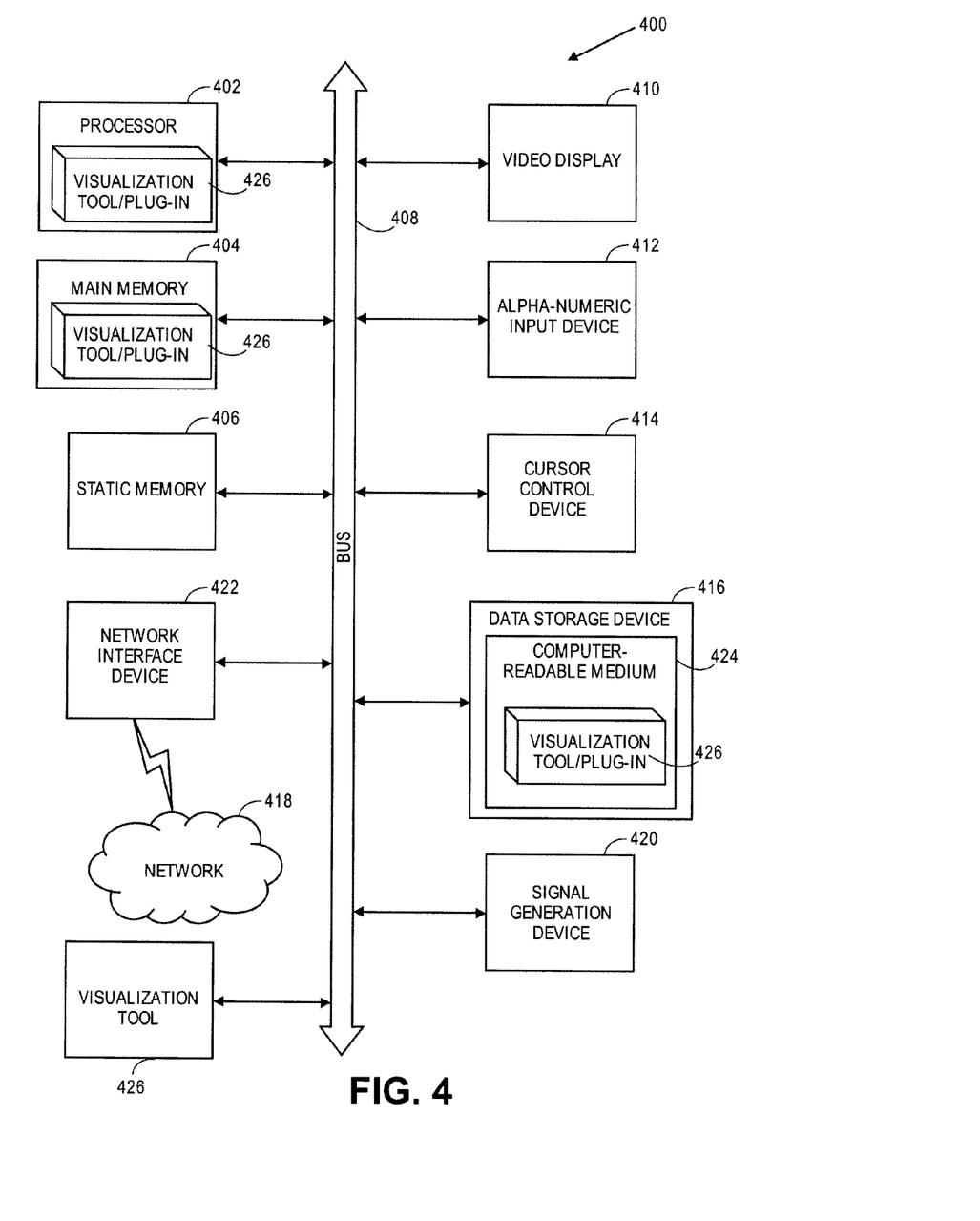
FIG. 4 is a diagram of one embodiment of a computer system implementing the integrated source code visualization tool.

FIG. 4 is a diagram of one embodiment of the computer implementation of the integrated source code and profiling data visualization tool. Within the computer system 400 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine (e.g., a client computer executing the desktop management program and the server computer executing the a remote application) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a secondary memory 416 (e.g., a data storage device in the form of a drive unit, which may include fixed or removable computer-readable medium), which communicate with each other via a bus 408.

Processing device 402 represents one or more general-purpose processing devices such as a microprocessor, central processing unit, or the like. More particularly, the processing 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing 402 may also be one or more special-purpose processing devices such as an application specific integrated circuit (ASIC), a field programmable gate array (FPGA), a digital signal processor (DSP), network processor, or the like. Processing device 402 is configured to execute the visualization tool 426 for performing the operations and steps discussed herein.

The computer system 400 may further include a network interface device 422. The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions (e.g., the visualization tool 426) embodying any one or more of the methodologies or functions described herein. The visualization tool 426 may also reside, completely or at least partially, within the main memory 404 and/or within the processing device 402 during execution thereof by the computer system 400, the main memory 404 and the processing device 402 also constituting machine-readable storage media. The visualization tool 426 may further be transmitted or received over a network 418 via the network interface device 422.

The machine-readable storage medium 424 may also be used to store the visualization tool 426 persistently. While the machine-readable storage medium 426 is shown in an exemplary embodiment to be a single medium, the term "machine-readable storage medium" and also "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

The visualization tool 426 can also be a discrete component 428 that performs the functions described herein. The visualization component 428 can be any type of special purpose or programmed device in communication with the computer system over the bus or through a network connection.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "sending," "calling," "displaying," "parsing," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Thus, a method and apparatus for integrated source code and profiling data visualization in an integrated development environment has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
    selecting a binary file in an integrated development environment (IDE);
    transmitting, by a processing device executing a utility specific plug-in in conjunction with a general purpose framework plug-in of the IDE, the binary file to a profiling utility external to the IDE;
    receiving, by the processing device executing the general purpose framework plug-in and the utility specific plug-in, profiling data generated by the profiling utility in view of the binary file;
    generating, using the profiling data, a data model correlating the profiling data with source code associated with the binary file; and
    displaying a graphical chart to visualize the profiling data of the binary file in view of the data model.

2. The method of claim 1, further comprising:
    displaying the source code corresponding to a user selected data point in the graphical chart.

3. The method of claim 1, wherein the utility specific plug-in and a general purpose framework plug-in are components of the IDE.

4. The method of claim 1, wherein the profiling utility is a Valgrind™ profiling utility that uses a massif profiler to analyze the binary file.

5. The method of claim 1, wherein the integrated development environment (IDE) is an Eclipse™ IDE.

6. The method of claim 1, further comprising:
    displaying a list of source code locations in response to a selection of a data point in the graphical chart.

7. The method of claim 6, further comprising:
displaying, in response to selection of a source code location, source code from the selected location.

8. The method of claim 1, further comprising:
passing the data model to a data charting module.

9. A non-transitory computer-readable medium having instructions stored thereon, which when executed by a processing device, cause the processing device to perform operations, comprising:
selecting a binary file in an integrated development environment (IDE);
transmitting, by a processing device executing a utility specific plug-in in conjunction with a general purpose framework plug-in of the IDE, the binary file to a profiling utility external to the IDE;
receiving, by the processing device executing the general purpose framework plug-in and the utility specific plug in profiling data generated by the profiling utility in view of the binary file;
generating, using the profiling data, a data model correlating the profiling data with source code associated with the binary file; and
displaying a graphical chart to visualize the profiling data of the binary file in view of the data model.

10. The non-transitory computer-readable medium of claim 9, the operations further comprising:
displaying the source code corresponding to a user selected data point in the graphical chart.

11. The non-transitory computer-readable medium of claim 9, wherein the utility specific plug-in and a general purpose framework plug-in are components of the IDE.

12. The non-transitory computer-readable medium of claim 9, wherein the profiling utility is a Valgrind™ profiling utility that uses a massif profiler to analyze the binary file.

13. The non-transitory computer-readable medium of claim 9, wherein the integrated development environment (IDE) is an Eclipse™ IDE.

14. The non-transitory computer-readable medium of claim 9, the operations further comprising:
displaying a list of source code locations in response to a selection of a data point in the chart.

15. The non-transitory computer-readable medium of claim 14, the operations further comprising:
displaying, in response to selection of a source code location, source code from the selected location.

16. The non-transitory computer-readable medium of claim 9, the operations further comprising:
parsing the output file into a data model and passing the data model to a data charting module.

17. A computer system, comprising:
a memory; and
a processing device coupled to the memory to:
select a binary file in an integrated development environment (IDE);
transmit, by the processing device executing a utility specific plug-in in conjunction with a general purpose framework plug-in of the IDE, the binary file to a profiling utility external to the IDE;
receive, by the processing device executing the general purpose framework plug-in and the utility specific plug in, profiling data generated by the profiling utility in view of the binary file;
generate, using profiling data, a data model correlating the profiling data with source code associated with the binary file;
display a graphical chart to visualize the profiling data of the binary file in view of the data model.

18. The computer system of claim 17, wherein the processing device further:
displaying the source code corresponding to a user selected data point in the graphical chart.

19. The system of claim 18, wherein the integrated development environment (IDE) is an Eclipse™ IDE and the profiling utility is a Valgrind™ profiling utility.

20. The system of claim 17, wherein the utility specific plug-in and a general purpose framework plug-in are components that generate a listing of function calls corresponding to the user selected data point.

* * * * *